(12) United States Patent
Tomonari et al.

(10) Patent No.: US 7,168,667 B2
(45) Date of Patent: Jan. 30, 2007

(54) BASE STRUCTURE OF RETAINER

(75) Inventors: Nobuyuki Tomonari, Tokyo (JP); Kenji Kosugi, Tokyo (JP)

(73) Assignee: Tamatoshi Co., Ltd., Tokyo (JP)

( * ) Notice: Subject to any disclaimer, the term of this patent is extended or adjusted under 35 U.S.C. 154(b) by 103 days.

(21) Appl. No.: 10/845,431

(22) Filed: May 13, 2004

(65) Prior Publication Data

US 2004/0262473 A1 Dec. 30, 2004

(30) Foreign Application Priority Data

Jun. 27, 2003 (JP) .......................... P2003-184276

(51) Int. Cl.
*A47G 29/02* (2006.01)

(52) U.S. Cl. ............ 248/246; 248/222.13; 248/223.51; 248/243

(58) Field of Classification Search ................ 248/245, 248/246, 243, 244, 222.13, 223.41, 223.51, 248/223.61
See application file for complete search history.

(56) References Cited

U.S. PATENT DOCUMENTS

| | | | | |
|---|---|---|---|---|
| 3,807,574 A | * | 4/1974 | Lanza | ......................... 211/207 |
| 4,753,354 A | * | 6/1988 | Patterson et al. | ............. 211/26 |
| 5,044,508 A | * | 9/1991 | Walter | ........................ 211/207 |

FOREIGN PATENT DOCUMENTS

| | | |
|---|---|---|
| EP | 0404725 | 12/1994 |
| EP | 1 312 287 | 5/2003 |
| FR | 2 696 510 | 4/1994 |
| GB | 2 125 511 | 3/1984 |
| JP | 3-114411 | 5/1991 |

* cited by examiner

*Primary Examiner*—Korie Chan
(74) *Attorney, Agent, or Firm*—Sturm & Fix LLP

(57) ABSTRACT

A base structure of a retainer comprising a pair of wall members 2 formed of a columnar body, which is vertically long, has a groove 4 formed in its longitudinal direction and has locking sections 5 formed in plural portions for locking a sliding member 3 at plural portions in the groove, and the sliding member 3 which is slidable in the groove of the wall member 2 and removably fitted to the locking section 5 through movable locking pieces 7.

5 Claims, 9 Drawing Sheets

BASE STRUCTURE OF RETAINER

CROSS REFERENCE TO RELATED APPLICATIONS

This application is based upon and claims the benefit of priority from the prior Japanese Patent Application No. 2003-184276, filed Jun. 27, 2003, the entire contents of which are incorporated herein by reference.

BACKGROUND

1. Field of the Invention

The present invention relates to a base structure of a retainer for shelves, arm-like hangers or hook-like display fittings for displaying commodities on a wall surface in department stores and other stores.

2. Description of the Related Art

For example, a conventional retainer for a shelf board to display commodities on a wall surface is known that a wide board-like wall member 32 having plural hook-like grooves 31 formed in the horizontal direction is attached to a wall surface, and a sliding member 34 which has a hook-like latching part 33 capable of latching in conformity with the hook-like grooves 31 of the wall member 32 is latched, wherein the hook-like groove 31 at an appropriate height is selected and the sliding member 34 can be latched at a desired position in the horizontal direction as shown in FIGS. 10 and 11.

As shown in FIG. 12, it is known that a latching hole 42 is formed in plural positions in the vertical direction of a columnar wall member 41, a hook-like latching part 44 which can be readily engaged with the latching hole 42 is formed on a sliding member 43, and the latching hole 42 at a suitable height is selected to latch the sliding member 43.

But, the above-described retainer for the shelf board is poor in slidability and has disadvantages that its engagement with and or removal from the groove is not easy.

Accordingly, the present invention is unique and different in structure from the above-described conventional retainers and provides a base structure of a retainer, which allows easy and quick engagement and removal of a sliding member and also change in position of shelf boards.

BRIEF SUMMARY OF THE INVENTION

The base structure of a retainer according to an embodiment of the present invention is a base structure of a retainer for a shelf, an arm-like hanger or a hook display fitting for displaying commodities on a wall surface, comprising a wall member which is vertically long and formed to have a columnar groove formed in a longitudinal direction and locking sections symmetrically formed at prescribed intervals in the groove; a sliding member which has a slide block for sliding inserted into the groove of the wall member and is provided with movable locking pieces, of which bottom portions are projected from both sides of the slide block by the elastic force of an elastic body, in the slide block; and a support arm which is protruded from the sliding member, wherein the insertion of the sliding member into the groove of the wall member causes to project the movable locking pieces so to be locked by the locking section in the groove, thereby preventing the slide block from lowering.

According to this base structure of a retainer, the wall members can be disposed with desired intervals and a height can be adjusted as desired because the wall members each are vertically long, formed to have the locking sections at prescribed intervals in the longitudinal direction and also formed in the columnar body. And, the locking section at a desired height can be selected, and the sliding member can be quickly engaged with and removed from the locking section because the locking sections are disposed with prescribed intervals at plural positions within the groove. Besides, the sliding member can be fitted to and removed from the groove with ease.

In the base structure of a retainer according to the embodiment of the invention, the sliding member is provided with the slide block which slides through the groove of the wall member; and the movable locking pieces which are configured to be housed in a substantially parallel state in the wall thickness of the slide block and projectable in the directions of both sides of the slide block by a turning section of which bottom ends are opened and closed by the elastic force of an elastic body with the top end as the center of turning.

According to this base structure of a retainer, the movable locking pieces are housed in the parallel state in the wall thickness of the slide block configuring the sliding member, and the movable locking pieces are configured to be projectable from both sides of the slide block by the elastic force of the elastic body. By configuring as described above, the movable locking pieces are automatically opened by the elastic force of the elastic body and locked by the locking sections of an open wall member and can be moved freely in the groove or can be removed because they are housed into the slide block in the groove excepting the locking sections. Thus, the locking position can be changed easily because the slide block can be moved to an appropriate position and locked by another locking section.

Besides, in the base structure of a retainer according to the embodiment of the present invention, the locking sections which are disposed at prescribed intervals in the groove of the wall member are comprised of a locking space, in which the bottom ends can be projected in the directions of both sides of the slide block when the movable locking pieces of the sliding member are opened with the top end side as the center, and have locking seating surfaces, by which the projected end faces of the movable locking pieces can be locked, formed in the locking space.

According to the base structure of a retainer, each of the locking sections in the plural positions provided in the groove of the wall member is comprised of the locking spaces, where the bottom end sides can be projected in the directions of both sides of the slide block when the movable locking pieces of the sliding member are opened with the top end side as the center, and has the locking seating surfaces capable of locking the projected end faces of the movable locking pieces within the locking space, so that the movable locking pieces are automatically opened within the locking space and their end faces can be locked by the locking seating surfaces. When the movable locking pieces are to be pulled out from the locking sections, the movable locking pieces are pushed against the wall surfaces of the locking space and automatically housed into the slide block, falling in a state capable of freely moving in the groove.

The base structure of a retainer according to the embodiment of the present invention has a male arc sliding surface formed on the sides of the top ends of the movable locking pieces disposed on the sliding member, a female arc sliding surface formed in the slide block side opposite to the male arc sliding surface, and both the arc sliding faces mutually engaged and slide to perform an opening or closing operation.

According to this base structure of a retainer, the male arc sliding surface formed on the top end side of the movable locking pieces and the female arc sliding surface formed on the plane opposite to the slide block are mutually engaged and slide so that the movable locking pieces are opened and closed smoothly.

In the base structure of a retainer according to the embodiment of the present invention, when the projected end faces of the movable locking pieces projected from both sides of the slide block are locked by the locking seating surfaces of the wall member, the top ends of the movable locking pieces come into contact with the arc faces formed at the upper part in the slide block, the side faces of the projected movable locking pieces also come into contact with the wall surfaces of the locking space, and the back end face of the slide block comes into contact with the bottom surface of the groove of the wall member to support a shelf load.

According to this base structure of a retainer, when the projected end faces of the movable locking pieces projected from both sides of the slide block are locked by the locking seating surfaces of the wall member, the top ends of the movable locking pieces come into contact with the arc faces formed above within the slide block, the side faces of the projected movable locking pieces also come into contact with the wall surfaces of the locking space, and the back end face of the slide block comes into contact with the bottom surface of the groove of the wall member. Thus, a shelf load is supported securely.

Besides, in the base structure of a retainer according to the embodiment of the present invention, the elastic body for opening and closing the movable locking pieces is comprised of a spring material.

According to this base structure of a retainer, the elastic body for opening and closing the movable locking pieces is formed of a spring material to provide the elastic force necessary for opening and closing without fail, and the structure can be simplified. Here, the spring material includes a leaf spring, a spring and the like but is not limited to them. Any material capable of providing the elastic force in the direction of opening and closing the movable locking pieces can be used.

The base structure of a retainer according to the embodiment of the present invention has a pin fixed to the slide block, and the top ends of the movable locking pieces are mutually contacted closely and sandwich the pin at the same time when the movable locking pieces are opened.

According to this base structure of a retainer, when the sliding member is removed from the wall member, the movable locking pieces are opened in free space without being disturbed by anything but prevented from dropping out of the slide block and from being lost because they are configured to sandwich the pin, which is fixed to the slide block, when they are opened.

The base structure of a retainer according to the embodiment of the present invention has the movable locking pieces which are chamfered their inserting end faces to facilitate the insertion into the groove of the wall member.

According to this base structure of a retainer, the movable locking pieces before the attachment to the wall member are projected from both sides of the slide block by the elastic force of the elastic body and in a state that their insertion into the groove of the wall member is disturbed. But, the inserting end faces of the movable locking pieces are chamfered, so that the movable locking pieces are moved backward by the chamfered inclined planes, and the insertion is allowed.

BRIEF DESCRIPTION OF THE DRAWINGS

The present invention will be described with reference to the drawings, which are provided for illustration only and do not limit the invention in any respect.

DETAILED DESCRIPTION OF THE INVENTION

An embodiment of the invention will be described with reference to the accompanying drawings.

Figure 1:
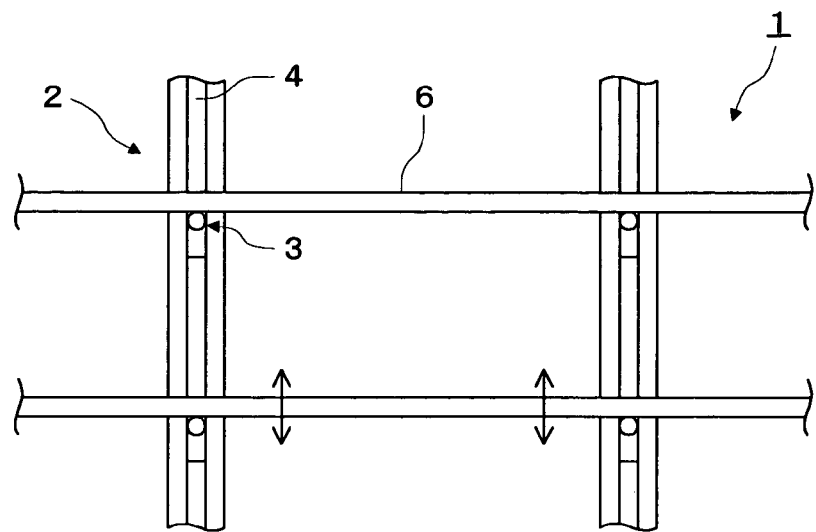
FIG. 1 is a drawing showing a schematic structure of a base structure of a retainer according to an embodiment of the invention.
Figure 2:
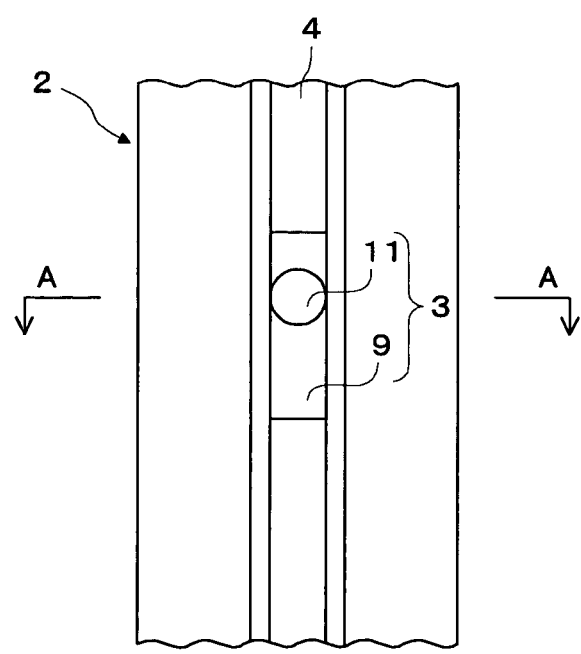
FIG. 2 is a partial front drawing showing a sliding member locked by a wall member.
Figure 3:
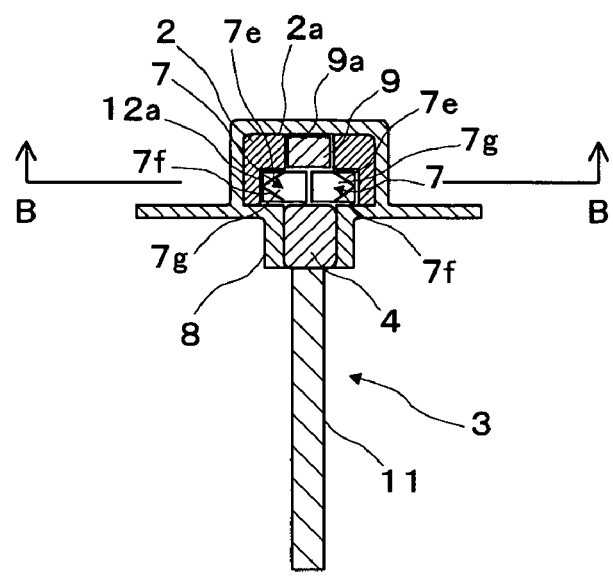
FIG. 3 is a sectional view taken along line A—A of FIG. 2.
Figure 4:
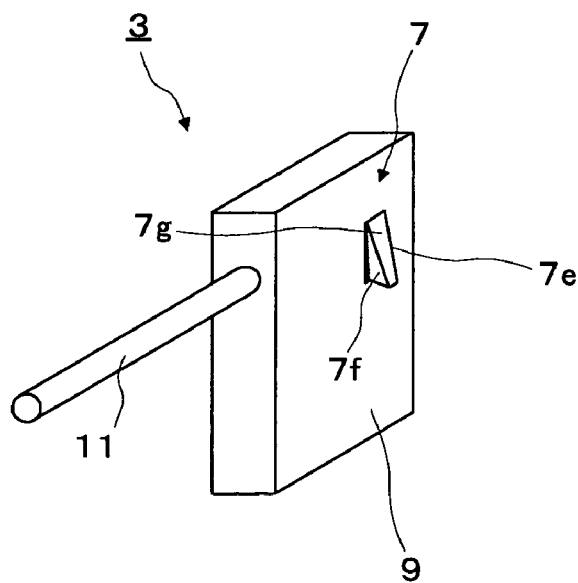
FIG. 4 is a perspective view of the sliding member.
Figure 5:
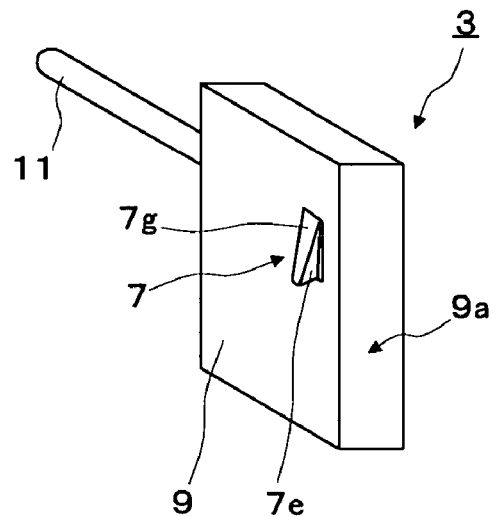
FIG. 5 is a perspective view of the sliding member.
Figure 6:
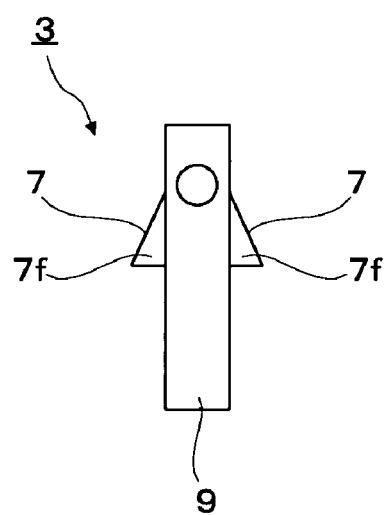
FIG. 6 is an end view of the sliding member.
Figure 7:
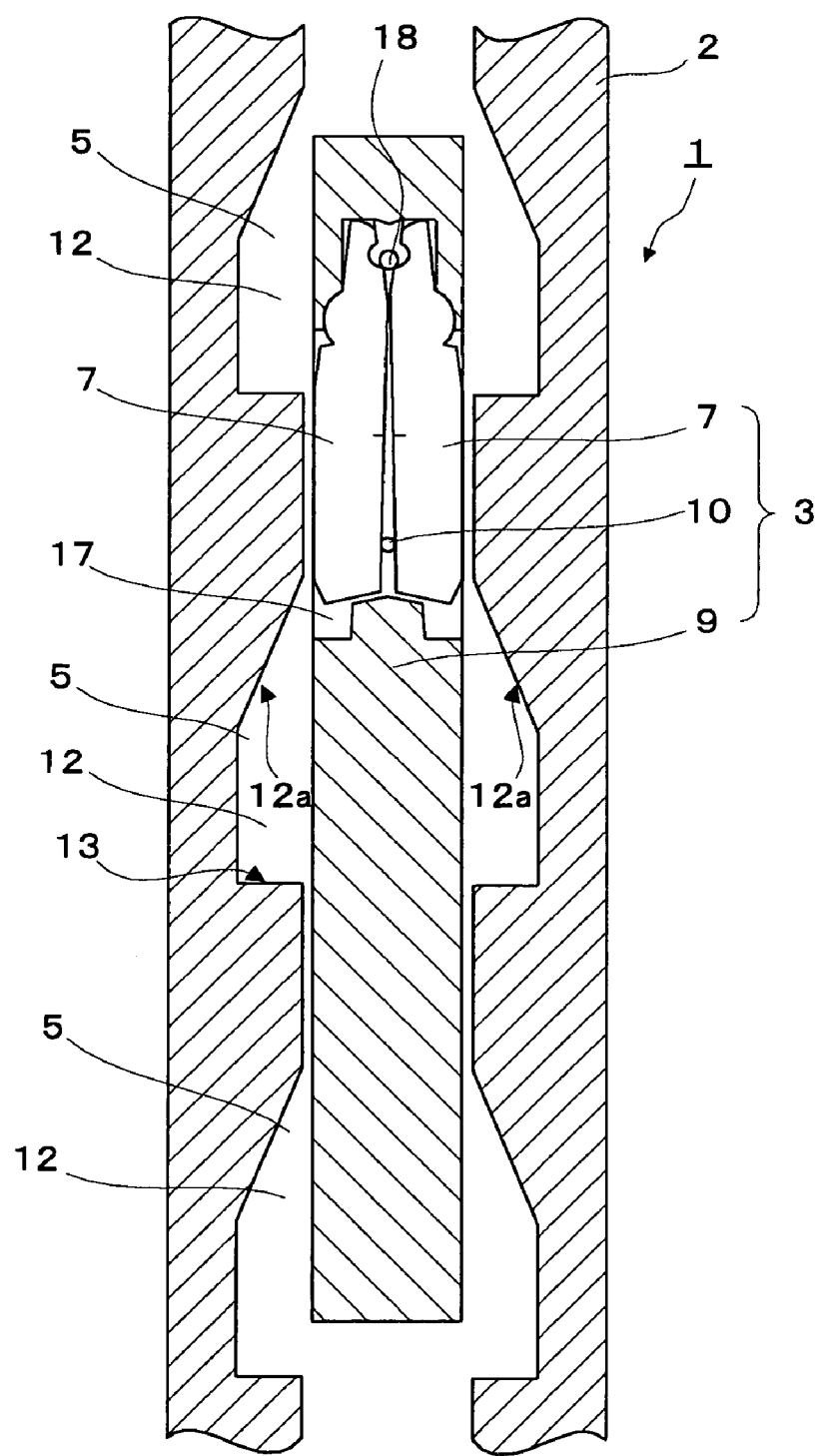
FIG. 7 is a sectional view taken along line B—B of FIG. 3, showing movable locking pieces in a housed state.
Figure 8:
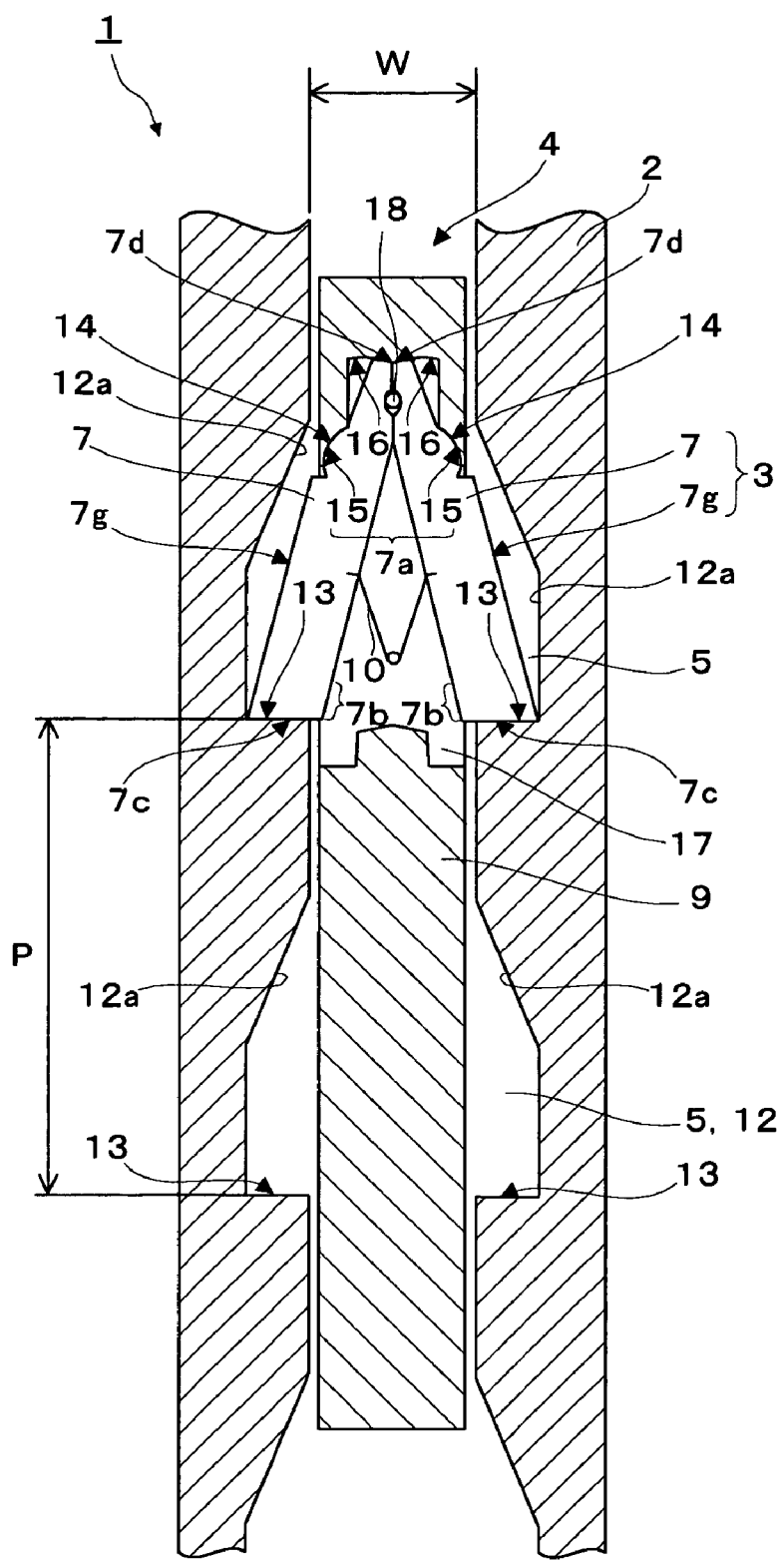
FIG. 8 is a sectional view taken long line B—B of FIG. 3, showing the movable locking pieces in a locked state.
Figure 9:
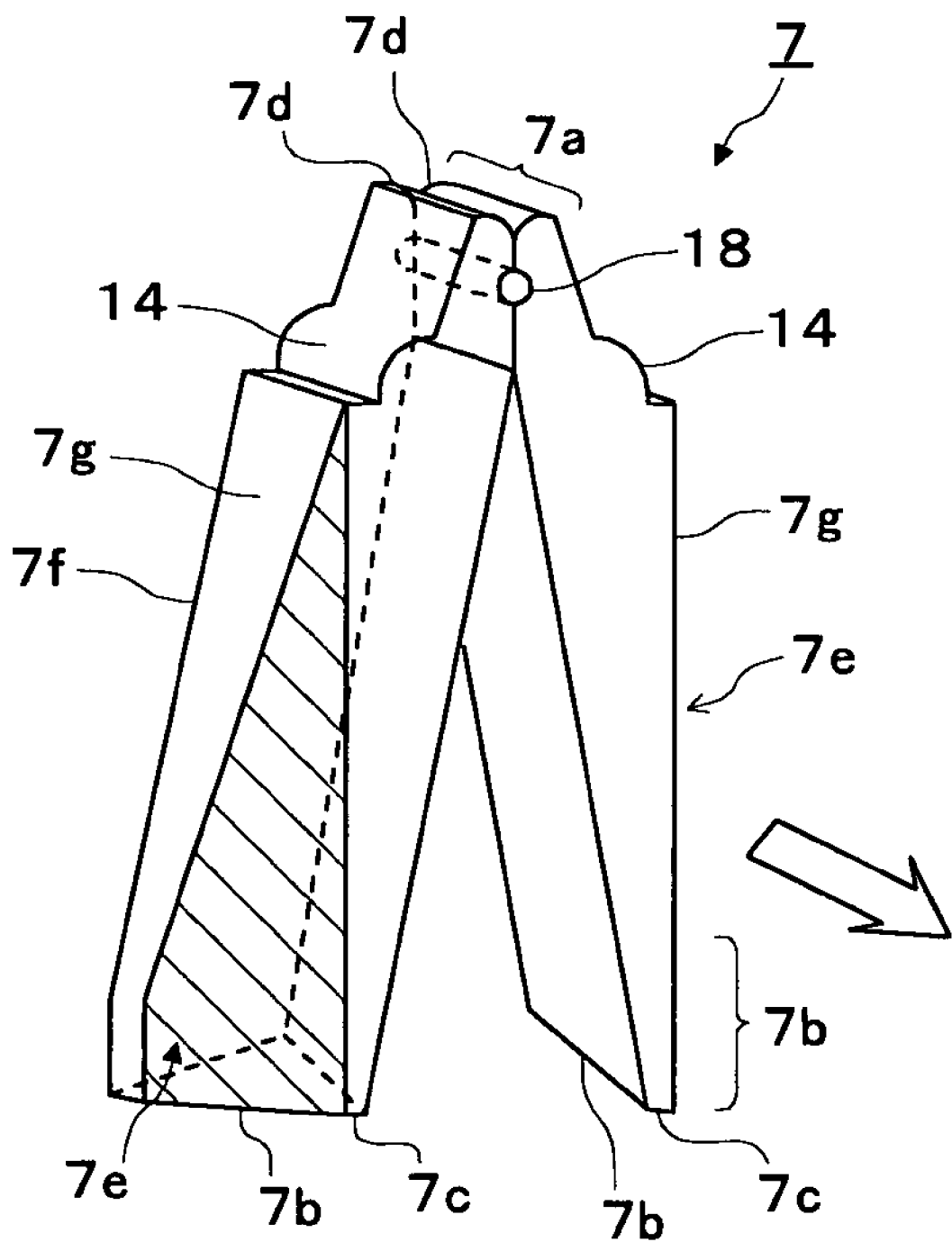
FIG. 9 is a perspective view of the movable locking pieces.
Figure 10:
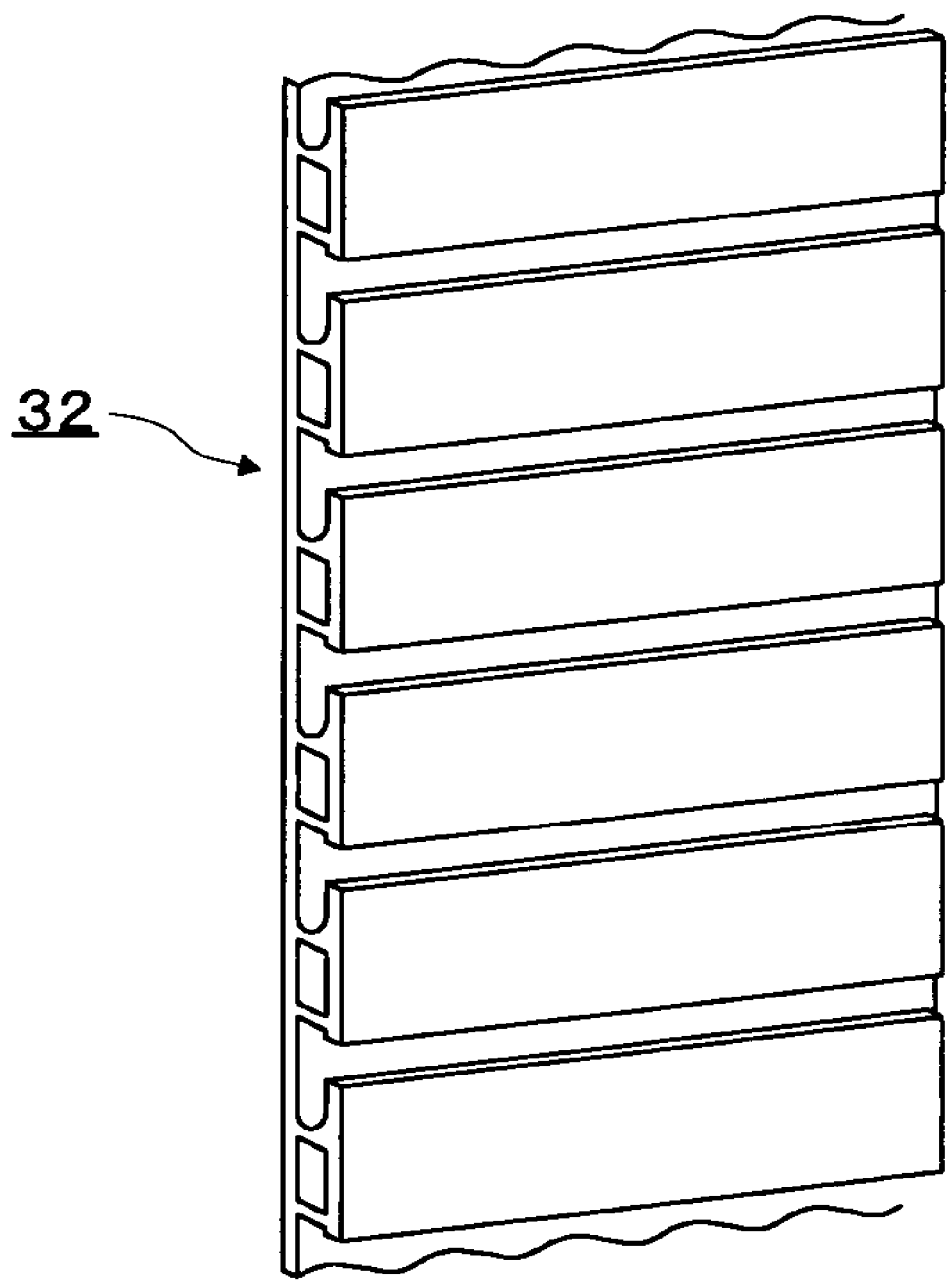
FIG. 10 is an explanatory drawing of a base structure of a conventional retainer.
Figure 11:
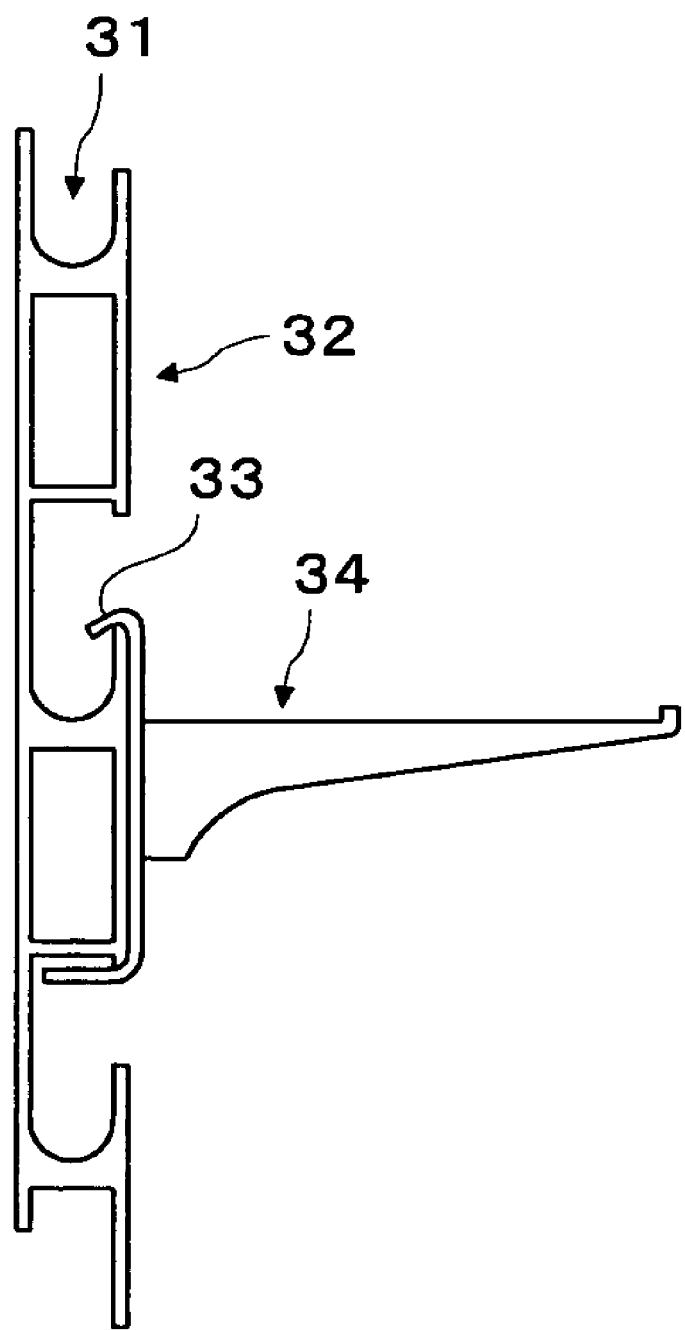
FIG. 11 is an explanatory drawing of the base structure of the conventional retainer.
Figure 12:
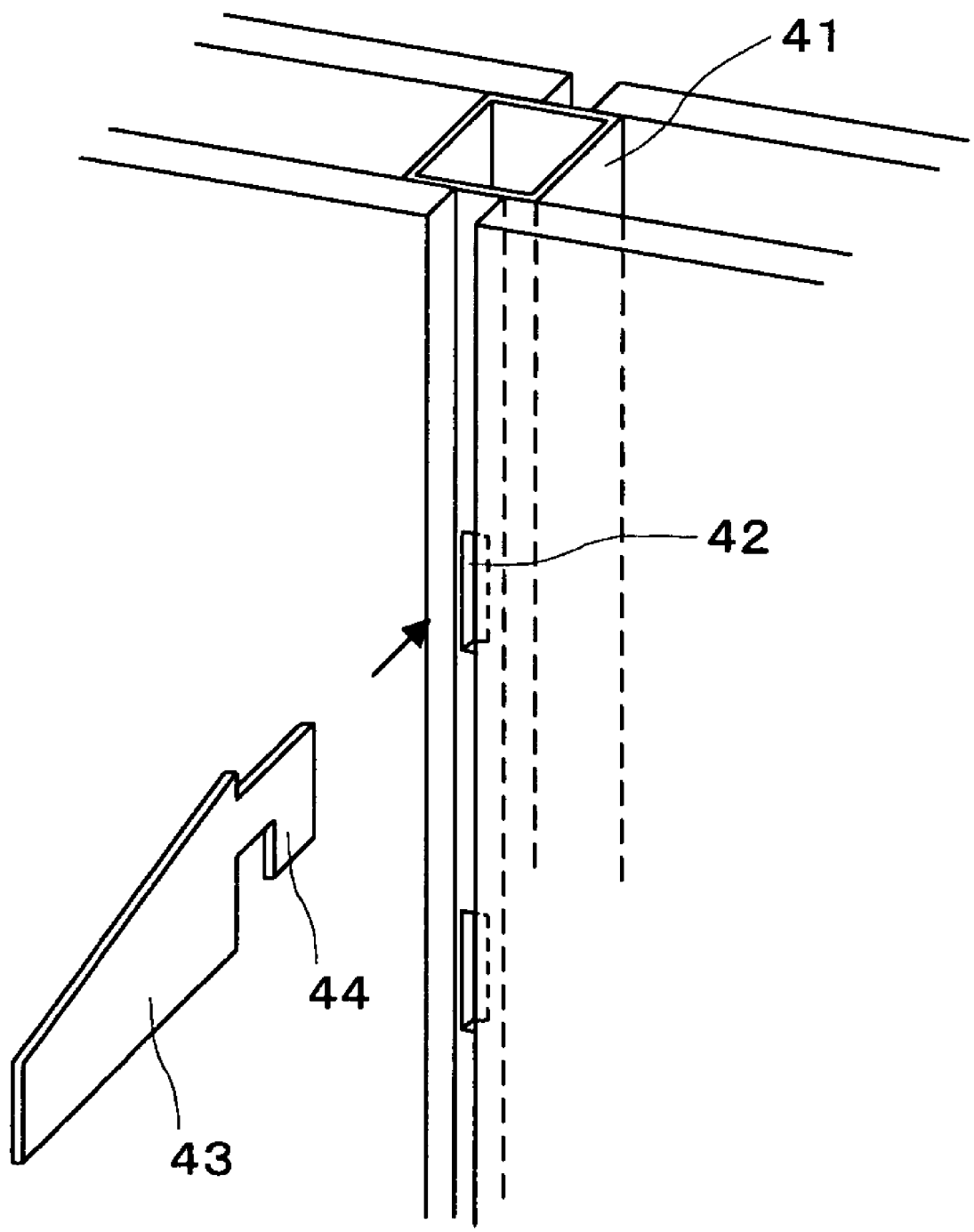
FIG. 12 is an explanatory drawing of a base structure of a conventional retainer.

FIG. 1 to FIG. 9 are pertinent to the embodiment of the invention. FIG. 1 is a drawing showing a schematic structure of a retainer for a shelf board, FIG. 2 is a partial front view showing a sliding member locked by a wall member; FIG. 3 is a sectional view taken along line A—A of FIG. 2; FIGS. 4 and 5 are perspective views of the sliding member; FIG. 6 is an end view of the sliding member; FIG. 7 is a sectional view taken along line B—B of FIG. 3, showing movable locking pieces in a housed state; FIG. 8 is a sectional view taken along line B—B of FIG. 3, showing the movable locking pieces in a locked state; and FIG. 9 is a perspective view of the movable locking pieces.

The base structure of a retainer of the invention will be described with reference to an example of using it for a retainer 1 for a shelf board which forms a display shelf for displaying commodities on a wall surface in department stores, shops and the like. As shown in FIG. 1 to FIG. 3, FIG. 7 and FIG. 8, a wall member 2 is vertically long and has a groove 4 formed in its longitudinal direction, and locking sections 5, 5, 5, . . . which, catch a sliding member 3 at plural positions, are symmetrically formed in the groove 4 at prescribed intervals. And, the sliding member 3 for supporting a shelf board 6 against the locking sections 5 of a pair of wall members 2 is configured to be detachable through movable locking pieces 7. A pair of guide walls 8 for stabilizing the sliding and mounting of the sliding member 3 are formed in a longitudinal direction at the inlet of the groove 4 as shown in FIG. 3.

In this embodiment, it is determined that the wall member 2 shown in FIG. 8 has a groove width W of 9 mm, and each interval P between the plural locking sections 5 is 25 mm.

The sliding member 3 is comprised of a slide block 9 which can slide in the groove of the wall member 2 as shown in FIG. 2 to FIG. 6, a pair of movable locking pieces 7 which are housed in a substantially parallel state within the wall section of the slide block 9 as shown in FIG. 7 and are configured to be projectable in the directions of both sides of the slide block 9 as bottom ends 7b are opened or closed by the elasticity of an elastic body 10 with a top end side 7a as the center of turning as shown in FIG. 8, and a shelf board supporting arm 11 which is formed to protrude forward from the slide block 9 (see FIGS. 4 and 5). In this embodiment, the slide block 9 is determined to have a thickness of 8 to 8.8 mm, so that it is easy to slide in the groove having a width of 9 mm of the wall member 2.

Meanwhile, as shown in FIG. 8, the locking section 5, which is formed in the plural portions at prescribed intervals in the groove 4 of the wall member 2, is formed of a locking space 12 in which the bottom ends 7b can be projected in the directions of both sides of the slide block 9 when the movable locking pieces 7 of the sliding member 3 are opened with the top end side 7a as the center, and locking seating surfaces 13 by which the projected end faces 7c of the movable locking pieces 7 are locked are formed in the locking space 12.

As shown in FIG. 8, the movable locking pieces 7 disposed in the sliding member 3 have a male arc sliding surface 14 formed on the side of the top end side 7a. And, a female arc sliding surface 15 is formed on the side of the slide block 9 which is opposite to the male arc sliding surface 14, so that the female arc sliding surface 15 and the male arc sliding surface 14 are mutually engaged and slide mutually to smoothly perform an opening or closing operation.

And, when the projected end faces 7c of the movable locking pieces 7 which are projected from both side faces of the slide block 9 are locked by the locking seating surfaces 13 of the wall member 2, top ends 7d of the movable locking pieces 7 come into contact with arc faces 16 which are formed on the upper portion within the movable locking piece housing space 17 of the slide block 9. At the same time, side faces 7f (see FIG. 4) of the projected movable locking pieces 7 come into contact with wall surfaces 12a of the locking space 12 (see FIG. 3), and a back end face 9a of the slide block 9 (see FIG. 3, FIG. 5) comes into contact with a groove's bottom surface 2a of the wall member 2 to support a shelf load.

As shown in FIG. 7 and FIG. 8, a pin 18 is erected in a movable locking piece housing space 17 for accommodating the movable locking pieces 7 in the slide block 9, and when the movable locking pieces 7 open, the top end sides 7a of the movable locking pieces 7 are mutually contacted closely (see FIG. 8) to hold the pin 18 therebetween at the same time. Thus, even when the sliding member 3 is taken out of the wall member 2 and the movable locking pieces 7 are automatically opened by the elasticity of the elastic body 10, the movable locking pieces 7 do not fall out because they hold the pin 18 therebetween.

When the slide block 9 of the sliding member 3 is to be inserted into the groove 4 of the wall member 2, it is hard to insert into the groove 4 because the movable locking pieces 7 are open in free space, namely the bottom ends 7b of the movable locking pieces 7 are projected from both sides of the slide block 9. To facilitate the insertion, the invention forms inclined planes by forming a chamfer 7e on the inserting (arrowed direction) end faces of the movable locking pieces 7 as shown in FIG. 9, so that the inclined planes are contacted with and pushed against an inlet of the groove 4 so to push the movable locking pieces 7 into the movable locking piece housing space 17. Thus, the slide block 9 can be inserted into the groove 4.

Then, the action of the base structure 1 of the above-configured retainer will be described.

The sliding member 3 before the insertion into the groove 4 of the wall member 2 is in a state that the bottom ends of the movable locking pieces 7 are projected from both sides of the slide block 9 as shown in FIG. 4 through FIG. 6. In this state, when the slide block 9 of the sliding member 3 is pushed against the groove 4 of the wall member 2, the movable locking pieces 7 are contacted against the inlet of the groove 4, and the insertion is disturbed. But, because the chamfer 7e is formed on the surfaces of the movable locking pieces 7 facing the insertion direction, the movable locking pieces 7 are pushed into the movable locking piece housing space 17 of the slide block 9 through the inclined planes of the chamfers 7e when the slide block 9 is further pushed with force. Thus, the slide block 9 can be inserted.

The sliding member 3 having the movable locking pieces 7 pushed into the slide block 9 is in a state completely out of the locking space 12 as shown in FIG. 7 and can be moved freely along the groove 4 of the wall member 2. When the sliding block 9 is moved to the position of the locking space 12 of the wall member 2, the movable locking pieces 7 are automatically opened by the elastic force of the elastic body 10 to project from both sides of the slide block 9 as shown in FIG. 8, and the projected end faces 7c of the bottom ends 7b are locked by the locking seating surfaces 13 of the wall member 2. When the movable locking pieces 7 are locked as described above, the projected end faces 7c are locked by the locking seating surfaces 13, and the side surfaces 7f of the projected movable locking pieces 7 are contacted to the wall surfaces 12a of the locking space 12 as shown in FIG. 3, the top ends 7d of the movable locking pieces 7 (see FIG. 8) come into contact with the arc faces 16 at the top in the movable locking piece housing space 17 of the slide block 9, and the back end face 9a of the slide block 9 (see FIG. 3, FIG. 5) is contacted to the groove's bottom face 2a of the wall member 2. Thus, a shelf load is supported.

More specifically, when the sliding member 3 caught by the wall member 2 as described above is slid upward from the caught state shown in FIG. 8, back surfaces 7g of the movable locking pieces 7 are pushed against the inclined wall surfaces 12a of the locking space 12, and the movable locking pieces 7 are pushed into the wall thickness of the slide block 9 so to be housed in a substantially parallel state as shown in FIG. 7.

Thus, when the movable locking pieces 7 are housed in the slide block 9, the sliding member 3 can be removed from the wall member 2. When the slide block 9 is slightly pulled toward you and held in a slightly pulled state without completely pulling out, it can be moved to a desired position in the vertical direction. And, when the sliding member 3 is to be moved to a desired position to lock the movable locking pieces 7 in the locking section 5 of the wall member 2, the slide block 9 is pushed into the groove 4 at the desired position, so that the movable locking pieces 7 are opened automatically in the locking space 12, and the projected end faces 7c are locked by the locking seating surfaces 13 as described above.

As described above, according to the base structure of the retainer of the invention, the wall member is vertically long and formed to have a columnar shape with the groove formed in its longitudinal direction, so that the wall member can be arranged with desired intervals, and the sliding member can be locked at an appropriate height because the locking sections are disposed at plural positions in the groove and the desired locking sections can be selected.

The sliding member to be caught by the wall member is configured such that the movable locking pieces are automatically projected from both side walls of the slide block by the elastic force of the elastic body, so that the sliding member can be moved freely in the groove of the wall member to engage with or remove from the locking section at an appropriate position easily and quickly.

It is to be understood that the present invention is not limited to the specific embodiment thereof illustrated herein, and various modifications may be made without deviating from the spirit and scope of the invention.

What is claimed is:

1. A base structure of a retainer for a shelf, an arm-like hanger or a hook display fitting for displaying commodities on a wall surface, comprising:
    a wall member which is vertically long and formed to have a columnar groove formed in a longitudinal direction, and locking sections symmetrically formed at prescribed intervals in the groove, having inclined wall surfaces to open or close bottom ends of pivotally movable locking pieces;
    a sliding member which has a slide block for sliding inserted into the groove of the wall member and is provided with the pivotally movable locking pieces which have top ends and bottom end faces, wherein the movable locking pieces have a male arc sliding surface on sides of said top ends, mutually engaged with and slide on a female arc sliding surface formed on a slide block side opposite to the male arc sliding surface to perform an opening or closing operation of the locking pieces in the slide block; and
    a support arm which is protruded from the sliding member,
    wherein the insertion of the sliding member into the groove of the wall member causes to project the movable locking pieces so to be locked by the locking section in the groove, thereby preventing the slide block from lowering.

2. The base structure of a retainer according to claim 1, wherein the locking sections, which are disposed at prescribed intervals in the groove of the wall member are comprised of a locking space, in which the bottom end faces of the locking pieces can be projected therein from both sides of the slide block when the movable locking pieces of the sliding member are opened with the top end moved to a center of the slide block, wherein the locking space has locked seating surface by which the projected end faces of the movable locking pieces can be locked therein.

3. The base structure of a retainer according to claim 2, wherein when the projected end faces of the movable locking pieces projected from both sides of the slide block are locked by the locking seating surfaces of the wall member, the top ends of the movable locking pieces come into contact with the female arc sliding surfaces formed at an upper part in the slide block, side faces of the projected movable locking pieces also come into contact with the wall surfaces of the locking space, and a back end face of the slide block comes into contact with a bottom surface of the groove of the wall member to support a shelf load.

4. The base structure of a retainer according to claim 1, wherein an elastic body for opening and closing the movable locking pieces is comprised of a spring material.

5. The base structure of a retainer according to claim 2, wherein, when the projected end faces of the movable locking pieces projected from both sides of the slide block are locked by the locking seating surfaces of the wall member, the top ends of the movable locking pieces come into contact with the female arc sliding surfaces formed at an upper part in the slide block, side faces of the projected movable locking pieces also come into contact with the wall surfaces of the locking space, and a back end face of the slide block comes into contact with a bottom surface of the groove of the wall member to support a shelf load, and the top ends of the movable locking pieces are mutually contacted closely and sandwich a pin fixed to the slide block at the same time when the movable locking pieces are opened.

* * * * *